(12) United States Patent
Kim et al.

(10) Patent No.: US 8,895,103 B2
(45) Date of Patent: Nov. 25, 2014

(54) SHRINKABLE FILM AND METHOD FOR MANUFACTURING SAME

(75) Inventors: Dong Jin Kim, Gumi-si (KR); Si Min Kim, Daegu (KR); Yun Jo Kim, Gumi-si (KR); Gi Sang Song, Gumi-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 68 days.

(21) Appl. No.: 13/807,582

(22) PCT Filed: Jun. 28, 2011

(86) PCT No.: PCT/KR2011/004717
§ 371 (c)(1),
(2), (4) Date: Feb. 7, 2013

(87) PCT Pub. No.: WO2012/002707
PCT Pub. Date: Jan. 5, 2012

(65) Prior Publication Data
US 2013/0136922 A1    May 30, 2013

(30) Foreign Application Priority Data

Jun. 29, 2010  (KR) .......................... 10-2010-0062374

(51) Int. Cl.
*B05D 3/02* (2006.01)
*B05D 3/12* (2006.01)
*B32B 27/36* (2006.01)
*B32B 27/40* (2006.01)

(52) U.S. Cl.
USPC ...... 427/172; 428/336; 428/423.7; 428/425.8

(58) Field of Classification Search
USPC .................. 428/423.7, 425.8, 336; 427/172
See application file for complete search history.

(56) References Cited

U.S. PATENT DOCUMENTS

| 7,495,058 | B2 * | 2/2009 | Kitada et al. .................. 525/453 |
| 2009/0263654 | A1 * | 10/2009 | Arai et al. ...................... 428/341 |
| 2012/0270058 | A1 * | 10/2012 | Tsumagari et al. ........... 428/447 |

FOREIGN PATENT DOCUMENTS

| KR | 10-2005-0004892 A | 1/2005 |
| KR | 10-2006-0009865 A | 2/2006 |
| KR | 10-2007-0094804 A | 9/2007 |
| KR | 10-2009-0108669 A | 10/2009 |

* cited by examiner

*Primary Examiner* — Thao T. Tran
(74) *Attorney, Agent, or Firm* — Sughrue Mion, PLLC

(57) ABSTRACT

Provided are a film for food packaging, capable of having excellent adhesion with a metal deposition layer and thus retaining moisture barrier property while having superior flexibility, transparency, and biodegradability, and a method for manufacturing the same.

4 Claims, No Drawings

SHRINKABLE FILM AND METHOD FOR MANUFACTURING SAME

CROSS REFERENCE TO RELATED APPLICATIONS

This application is a National Stage of International Application No. PCT/KR2011/004717 filed Jun. 28, 2011, claiming priority based on Korean Patent Application No. 10-2010-0062374, filed Jun. 29, 2010, the contents of all of which are incorporated herein by reference in their entirety.

TECHNICAL FIELD

The following disclosure relates to a film for food packaging and a method for manufacturing the same, and more particularly, to a film for food packaging capable of having excellent adhesion with a metal deposition layer and thus retaining excellent moisture barrier property while having superior flexibility, transparency, and biodegradability, and a method for manufacturing the same.

BACKGROUND

Polyethylene, polypropylene, polyvinyl chloride, polystyrene, polyester, and the like from petroleum are used for general plastic shrinkable films. Since these shrinkable films are chemically and biologically stable, they need a significantly long time to decompose, which causes serious environmental problems.

Currently, commonly used biodegradable shrinkable films are mainly made of polylactic acid, but since they have low shrinkage ratios and have brittle characteristics due to a crystallization phenomenon in a film manufacturing procedure, the uses thereof are limited. In order to improve the crystallization phenomenon, biodegradable aliphatic polyester having a glass transition temperature of 0° C. or lower is blended in the film manufacture procedure. However, the usability thereof is deteriorated to lead an increase in film opacity, resulting in limited uses thereof, and thermal characteristics of the resin blended itself leads to reduced productivity and the shrinkage ratios of final products are difficult to control, resulting in limited uses thereof.

In addition, since the other processes are not carried out in the manufacturing procedure of the final film, aluminum deposited after an aluminum deposition process for being used in food packaging and the like may be delaminated or separated, resulting in limited uses.

SUMMARY

An embodiment of the present invention is directed to providing a film for food packaging, capable of having excellent moisture barrier property as well as excellent transparency, flexibility, and biodegradability.

Specifically, an embodiment of the present invention is directed to providing a film for food packaging having excellent moisture barrier property, by forming a metal deposition layer on one surface of a biodegradable flexible/shrinkable film containing lactic acid as a main component. Here, an embodiment of the present invention is directed to providing a film for food packaging, capable of having no occurrence of delamination of a metal deposition layer due to printing and lamination after forming the metal deposition layer.

Specifically, an embodiment of the present invention is directed to providing a film for food packaging, capable of having improved adhesion with a metal deposition layer, by a biodegradable film containing a lactic acid of 10~99 wt % and an aliphatic or aliphatic-aromatic polyester resin of 1~90 wt %, of which biodegradability is 95% or more, shrinkage ratios in the machine direction and the transverse direction at the time of shrinkage in a water bath at 90° C. for 10 seconds are 5~60%, and tensile strength is 100~600 Kg/cm², and a polyurethane coating layer formed on one surface of the biodegradable film.

Specifically, the present invention relates to a film for food packaging capable of having excellent moisture barrier property and a method for manufacturing the same. The film for food packaging of the present invention includes: a biodegradable film containing 10~99 wt % of lactic acid and 1~90 wt % of aliphatic or aliphatic-aromatic polyester resin; a polyurethane coating layer formed by coating a polyurethane coating composition on one surface of the biodegradable film; and a metal deposition layer formed on the polyurethane coating layer.

The film for food packaging of the present invention is characterized by the polyurethane coating layer in order to enhance adhesive strength between the biodegradable film and the metal deposition layer. In particular, the polyurethane coating layer is formed through an in-line coating method in the stretching process of the biodegradable film, so that there can be provided a film for food packaging, capable of having excellent adhesion with the biodegradable film, excellent adhesion with the metal deposition layer in a subsequent process, and low moisture permeability, and being superior in overall physical properties.

Further, a method for manufacturing a shrinkable film having excellent moisture barrier property of the present invention, the method includes:

a) preparing an unstretched film by melting and extruding 10~99 wt % of lactic acid and 1~90 wt % of aliphatic or aliphatic-aromatic polyester resin;

b) coating a water-dispersed polyurethane coating composition on one surface of the unstretched film through an in-line coating process;

c) uniaxially stretching the unstretched film coated with the water-dispersed polyurethane coating composition in the transverse direction (TD);

d) heat-treating the uniaxially stretched film at 50~100° C.; and e) forming a metal deposition layer on a polyurethane coating layer of the uniaxially stretched film.

Hereinafter, the present invention will be described in more detail.

In the present invention, the biodegradable film is a uniaxially stretched film containing polylactic acid resin as a main component, and contains polylactic acid resin containing 10 wt % or more of lactic acid. More specifically, the biodegradable film contains 10~99 wt % of lactic acid. If the content of lactic acid is below 10 wt %, crystallinity is low and thus heat resistance may be significantly deteriorated, and uniform shrinkage by increased shrinkage stress may not occur. The content of the lactic acid is preferably 70 wt % or more, and more preferably 90 wt % or more. In addition, an anti-oxidant agent, a heat stabilizer, a UV blocking agent, and the like may be added without affecting expression characteristics of the biodegradable film of the present invention.

In addition to the raw material resin, aliphatic or aliphatic-aromatic polyester resin having a glass transition temperature of −60~60° C. may be blended for use together. As for the aliphatic polyester resin, at least one selected from the group consisting of phthalic acid dicarboxylic acid, diphenyl ether dicarboxylic acid, and the like, may be used at such a content that intrinsic biodegradability thereof is not affected. The biodegradable aliphatic/aromatic copolyester resin is prepared by polycondensation of aromatic dicarboxylic acid having a benzene ring, such as, dimethyl terephthalate or terephthalic acid, and aliphatic dicarboxylic acid, such as, succinic acid or adipic acid, as dicarboxylic acid components, and aliphatic (including cyclic aliphatic) glycol containing at least one selected from 1.4-buthandiol and ethylene glycol. Here, the mole ratio of aliphatic dicarboxylic acid and aromatic dicarboxylic acid is 60:40 to 50:50.

In the present invention, examples of the biodegradable aliphatic polyester resin may include polylactone, polybutylene succinate, and the like, but are not limited thereto.

The content of the aliphatic or aliphatic-aromatic polyester resin is preferably 1~90 wt % based on the total weight of raw materials. If the content thereof is above wt %, kneadability with polylactic acid may be deteriorated and thus film formation is difficult, thermal characteristics may be deteriorated, and opacity of the final film may be increased. If the content thereof is below 1 wt %, it may be difficult to impart flexibility to a film. The content of the aliphatic or aliphatic-aromatic polyester resin is preferably 5~80 wt % and more preferably 30~60 wt % in view of transparency and flexibility of the film.

As the biodegradable film of the present invention, a biodegradable film having opacity of 30% or lower, biodegradability of 95% or higher, shrinkage ratios in the machine direction (MD) and the transverse direction (TD) at the time of shrinkage in a water bath at 90° C. for 10 seconds of 5~60%, and tensile strength of 100~600 Kg/cm$^2$ is preferably used.

If opacity thereof is above 30%, the film may not be used for a packaging purpose for showing the inside, and thus the use of the film is limited. In addition, as for the biodegradable film, the shrinkage ratios in the machine direction (MD) and the transverse direction (TD) at the time of shrinkage in a water bath at 90° C. for 10 seconds are preferably 5~60%. If the shrinkage ratio is below 5%, shrinkage is too small and thus the film may not be applied to various types of containers, and problems on external appearance may occur even though the film shrinks. If the shrinkage ratio is above 60%, the shrinking rate is fast and thus problems on external appearance may occur. The tensile strength is preferably 100~600 kg/cm$^2$. If the tensile strength is below 100 Kg/cm$^2$, wrinkles may be generated due to mechanical tension, resulting in defective printing, in the subsequent processes such as printing and laminating, or fracture may occur in the subsequent processes. If the tensile strength is above 600 Kg/cm$^2$, the film may be brittle and thus may be easily fractured or broken due to external impact. The tensile strength is preferably 200 Kg/cm$^2$~550 Kg/cm$^2$, and more preferably 300 Kg/cm$^2$~500 Kg/cm$^2$.

Then, in the present invention, the polyurethane coating layer is configured to enhance adhesive strength between the biodegradable film and the metal deposition layer, and is preferably formed by coating a water-dispersed polyurethane coating composition through an in-line coating process. Here, the coating thickness, which is a dried coating thickness, is preferably 0.01~0.1 µm since excellent adhesion is obtained without affecting physical properties such as moisture barrier property of the film. More specifically, the water-dispersed polyurethane coating composition contains 0.5~1.0 wt % of polyurethane based binder resin, 0.01~0.5 wt % of a silicon based wetting agent, and the remainder water.

In the present invention, the metal deposition layer made of such as aluminum layer or the like is formed on one surface of the film, more specifically, on the polyurethane coating layer, in order to more improve moisture barrier property of the final film. Sputtering or the like may be employed for a depositing method, and the deposition thickness of the metal deposition layer is preferably 200 Å or more, more preferably 200~1000 Å, and most preferably, 500 Å-1000 Å. If the thickness of the metal deposition layer is below 200 Å, moisture barrier property required may not be satisfied, and thus the use of the film may be limited.

In the film for food packaging of the present invention, peeling strength of the metal deposition layer needs to be 100 g/cm or higher at room temperature and hydrothermal treatment (95° C., 30 min) after deposition of aluminum or the like. If the peeling strength is below 100 g/cm, the metal deposition layer may be delaminated during procedures of transfer, storage, and the like of products. The peeling strength is preferably 120 g/cm and more preferably 150 g/cm. In addition, the film having moisture permeability of $1\times10^{-2}$~$1\times10^{-4}$ (g/m$^2$×day) is suitably used as a film for food packaging.

Hereinafter, a method for manufacturing the film for food packaging of the present invention will be described in detail. The procedure of manufacturing a film for food packaging of the present invention may be divided into preparing an unstretched film by melting and extruding biodegradable resin; uniaxially stretching the unstretched film; performing heat-setting; performing cooling; and forming a metal deposition layer on the uniaxially stretched film.

More especifically, the method for manufacturing a film for food packaging, the method including:

a) preparing an unstretched film by melting and extruding 10~99 wt % of lactic acid and 1~90 wt % of aliphatic or aliphatic-aromatic polyester resin;

b) coating a water-dispersed polyurethane coating composition on one surface of the unstretched film through an in-line coating process;

c) uniaxially stretching the unstretched film coated with the water-dispersed polyurethane coating composition in the transverse direction (TD);

d) heat-treating the uniaxially stretched film at 50~100° C.; and e) forming a metal deposition layer with a thickness of 200 Å-1000 Å on a polyurethane coating layer of the uniaxially stretched film.

Herein, in the melting and extruding of the step a), the raw material resin is melted, kneaded, and extruded by using an extruder at 180~220° C., and then is rapidly cooled and solidified passing through cooling rollers, to thereby obtain an unstretched film. Here, the temperature of the cooling rollers is preferably 10~60° C. If the temperature of the cooling rollers is below 10° C., the crystallizing rate may be too fast, resulting in increasing opacity, and the raw material resin may not adhere to the cooling rollers, resulting in surface defects due to non-uniform cooling. If the temperature of the cooling rollers is above 60° C., the raw material resin may adhere to the cooling rollers and thus manufacturing of the film is difficult. The temperature of the cooling rollers is preferably 20~50° C. and more preferably 25~40° C.

Next, the unstretched film is passed through rollers transferred in a machine direction (MD), subjected to an in-line coating (ILC) process, passed through a preheating section of 70~90° C., stretched at a stretching ratio of 3~6 times in a transverse direction (TD) at 60~80° C., and then passed through a heat treatment section of 50~100° C., to thereby manufacture a film. If the temperature for heat treatment is below 50° C., the shrinkage ratio may be excessively increased. If the temperature of heat treatment is above 100° C., the shrinkage ratio required may not be obtained, and thus the use of the film is limited.

In the uniaxial stretching of the unstretched film, the in-line coating (ILC) process employs a water-dispersed polyurethane coating composition, and the water-dispersed polyurethane coating composition contains a polyurethane resin solid content of 0.5 to 1.0 wt %, a silicon based wetting agent of 0.01~0.5 wt %, and the remainder water.

DETAILED DESCRIPTION OF EMBODIMENTS

Hereinafter, the present invention will be in detail described by examples, but the present invention is not limited to the following examples.

Hereinafter, polylactic acid resin used in examples and comparative examples was 4032D purchased from NatureWorks LLC, having a melting point of 170° C., a glass transition temperature of 62° C., and a lactic acid content of 98.5%.

Example 1

A master batch was prepared by adding 60% of polylactic acid resin as raw material resin, polylactone (DAICELL Chemical Company, Celgreen), and silicon dioxide having an average particle size of 2.7 μm so as to be 450 ppm in a final film, followed by blending. The master batch was dried at 110° C. for 2 hours by using a hot air drier, melted and extruded at 200° C., and rapidly cooled and solidified passing through cooling rollers of 25° C., to thereby prepare an unstretched film.

A water-dispersed polyurethane coating composition was coated on one surface of the unstretched film through an in-line coating (ILC) process such that the dried coating thickness thereof was 0.04 μm. The water-dispersed polyurethane coating composition contained 0.8 wt % of solid of polyurethane resin (DKC, Superflex 210), 0.1 wt % of silicon based wetting agent (DowCorning, Q2~5212), and the remainder water.

The unstretched film coated with the water-dispersed polyurethane coating composition was passed through a preheating section of 80° C. using rollers transferred in a machine direction (MD), stretched at a stretching ratio of 4.0 times in a transverse direction (TD) at 70° C., and then passed through a heat treatment section of 90° C., to thereby manufacture a film. Physical properties of the manufactured film were shown in Table 1.

An aluminum deposition layer with a thickness of 1000 Å was formed on one surface of the manufactured film by using a metal deposition system, to thereby manufacture a final film. Physical properties of the manufactured deposition film were shown in Table 1.

Example 2

A film was manufactured by the same method as Example 1, except that a master batch was prepared by using 45 wt % of polylactone, and physical properties of the film were shown in Table 1.

Example 3

A film was manufactured by the same method as Example 1, except that a master batch was prepared by using 30 wt % of polylactone, and physical properties of the film were shown in Table 1.

Example 4

A film was manufactured by the same method as Example 1, except that a master batch was prepared by using polybutylene succinate resin instead of polylactone, and physical properties of the film were shown in Table 1.

Example 5

A film was manufactured by the same method as Example 1, except that the thickness of the metal deposition layer was 200 Å, and physical properties of the film were shown in Table 1.

Comparative Example 1

A film was manufactured by the same method as Example 1, except that an in-line coating process is omitted and the temperature for a heat treatment section was 30° C., and physical properties of the film were shown in Table 1.

Comparative Example 2

A film was manufactured by the same method as Example 1, except that an in-line coating process is omitted and the temperature for a heat treatment section was 150° C., and physical properties of the film were shown in Table 1.

Characteristics of the films manufactured in Examples 1 to 5 and Comparative Examples 1 and 2 were evaluated.

1. Lactic Acid Content

Lactic acid content was measured using an automatic polarimeter (P-1020) at a wavelength of 589 nm of a sodium lamp and calculated by using software.

2. Tensile Strength

Tensile strength in a transverse direction of a film was measured by using a tensile test machine according to ASTM D 882.

3. Shrinkage Ratio

A film was cut into a rectangular size of 15 mm (MD)×400 mm (TD) in a machine direction (MD) and a transverse direction (TD). An unbroken line was drawn at 50 mm from both ends of the rectangular film in the TD along the MD, to thereby prepare a sample having an effective measurement length of 300 mm. The sample was completely immersed in warm water of 90° C.±0.5° C. under non-load while tweezers hold within 50 mm from one end of the sample without distinction of left and right, and in that state, the film was thermally shrunken for 10 seconds, and then left at room temperature for 1 minute. A reduced length of the measurement length of 300 mm in the TD, which was initially indicated by the unbroken line, was measured, to thereby obtain a thermal shrinkage ratio in the TD of the film according to Equation 1 below.

$$\text{Thermal shrinkage ratio (\%)} = (300 \text{ mm} - \text{length after shrinkage})/300 \text{ mm} \times 100 \qquad \text{Equation 1}$$

4. Opacity

Opacity was measured according to ASTM D-1003. Two edge sites, one center site, and seven random sites on a biodegradable flexible/shrinkage film were extracted, and then were cut into 5 cm×5 cm sizes. Opacity thereof (Haze, %) was measured by placing each in a film haze meter (NDH-5000). Five measurement values except for the maximum value and the minimum value were averaged, so that opacity (Haze, %) was calculated.

5. Biodegradability

The ratio of biodegradability value thereof measured according to KS M3100~1(2003) based on that of a standard material was calculated by Equation 2 below.

$$\text{Ratio of Biodegradability (\%)} = (\text{biodegradability of sample}/\text{biodegradability of standard material}) \times 100 \qquad \text{Equation 2}$$

6. Peeling Strength 50 wt % of thermosetting polyurethane based adhesive (Neoforce, KUB-338S) and 50 wt % of ethylacetate as a solvent were used with respect to an aluminum deposition layer of a deposition film, and 11 wt % of a polyurethane based curing agent (Neoforce, CL-100) was used with respect to 100 wt % of the adhesive. At the time of laminating, first laminating was performed by allowing 5 kg-rolls to reciprocate in the laminating section, and second laminating was performed on the first laminated sample by using a laminator with non-heat at speed level 3. This sample was hardened in a hot air oven of 60° C. for 15 hours under a pressure of 16 g/cm². The thus laminated sample was cut at a width interval of 1 cm, and then peel strength (g/cm) between an aluminum deposition layer and a polyurethane coating layer was measured in a 180° peel manner by using a friction factor measuring instrument.

7. Moisture Permeability

Moisture Permeability was measured according to ASTM D-3985. The final deposition film was cut into A4-size, which was then placed in a moisture meter (Permatran-W, Model 3/61). Then, moisture permeability (g/m²×day) was measured seven times at 38° C.±2° C. and 100 RH %, and five measurement values except for the maximum value and the minimum value were averaged, to thereby calculate moisture permeability (g/m²×day).

TABLE 1

| | Uniaxially Stretched Film | | | | Deposition Film | |
|---|---|---|---|---|---|---|
| | Tensile Strength Kg/cm² | Shrinkage ratio % | Opacity % | Bio-degradability % | Peel Strength g/cm | Moisture Permeability g/m² × day |
| Example 1 | 390 | 37 | 4.0 | 100 | 105 | $2.7 \times 10^{-3}$ |
| Example 2 | 412 | 36 | 3.1 | 100 | 108 | $4.3 \times 10^{-3}$ |
| Example 3 | 513 | 36 | 2.2 | 100 | 103 | $7.2 \times 10^{-3}$ |
| Example 4 | 385 | 38 | 3.9 | 100 | 104 | $3.3 \times 10^{-3}$ |
| Example 5 | 386 | 36 | 4.0 | 100 | 97 | $3.2 \times 10^{-1}$ |
| Comparative Example 1 | 388 | 76 | 4.2 | 100 | 58 | $8.7 \times 10^{-2}$ |
| Comparative Example 2 | 393 | 7 | 4.1 | 100 | 61 | $5.7 \times 10^{-2}$ |

It was confirmed from the results of Table 1 above that the biodegradable flexible/shrinkable film according to the present invention had excellent shrinkage, transparency, flexibility, deposition, and the like. Whereas, it can be seen that, in Comparative Example 1 out of the ranges of the present invention, the temperature for heat treatment of the biodegradable film was too low, resulting in lowering shrinkage ratio, and the polyurethane coating layer was not formed between the biodegradable film and the metal deposition layer, resulting in significantly decreasing peel strength of the metal deposition layer. In addition, it can be seen that, in Comparative Example 2, the temperature for the heat treatment section was too high, and thus the shrinkage ratio was too low.

The film for food packaging according to the present invention has excellent uniformity in shrinkage, transparency, flexibility, and deposition, and thus, can not be easily fractured by defects due to delamination of the deposition layer and external impact at the time of transfer/storage and can be used as various kinds of packaging materials in virtue of intrinsic flexibility thereof.

As set forth above, the film for food packaging according to the present invention has uniform shrinkage, transparency, flexibility, and deposition, and thus can not be easily broken by defects due to delamination of the deposition layer and external impact at the time of transfer/storage thereof, and can be used as various kinds of packaging materials due to intrinsic flexibility thereof.

What is claimed is:

1. A method for manufacturing a shrinkable film, the method comprising:
   a) preparing an unstretched film by melting and extruding 10-99 wt % of lactic acid and 1-90 wt % of aliphatic or aliphatic-aromatic polyester resin;
   b) coating a water-dispersed polyurethane coating composition on one surface of the unstretched film through an in-line coating process;
   c) uniaxially stretching the unstretched film coated with the water-dispersed polyurethane coating composition in the transverse direction (TD);
   d) heat-treating the uniaxially stretched film at 50-100° C.; and
   e) forming a metal deposition layer with a thickness of 200 Å-1000 Å on a polyurethane coating layer of the uniaxially stretched film.

2. The method of claim 1, wherein the step a) further comprises performing rapid cooling through cooling rollers of 10-60° C., after the melting and extruding.

3. The method of claim 1, wherein in the step c), the stretching is performed at a stretching ratio of 3-6 times and 60-80° C.

4. The method of claim 3, wherein the water-dispersed polyurethane coating composition comprising 0.5-1.0 wt % of polyurethane based binder resin, 0.01-0.5 wt % of a silicon based wetting agent, and the remainder water.

* * * * *